United States Patent
Kauffman et al.

(10) Patent No.: US 6,260,040 B1
(45) Date of Patent: *Jul. 10, 2001

(54) SHARED FILE SYSTEM FOR DIGITAL CONTENT

(75) Inventors: Steven Victor Kauffman, San Jose; Lara Marie Lewis, Campbell; James Albert Willey, Cupertino, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,951

(22) Filed: Jan. 5, 1998

(51) Int. Cl.[7] ................................................ G06F 17/30
(52) U.S. Cl. ............................ 707/10; 707/9; 707/200; 709/203; 345/331
(58) Field of Search .................. 707/10, 8, 9, 200, 707/203; 395/200.03; 709/201, 203, 217; 345/329, 330, 331

(56) References Cited

U.S. PATENT DOCUMENTS

| | | |
|---|---|---|
| 4,875,159 | 10/1989 | Cary et al. . |
| 4,887,204 | 12/1989 | Johnson et al. . |
| 4,888,681 | 12/1989 | Barnes et al. . |
| 5,043,876 | 8/1991 | Terry . |
| 5,088,031 * | 2/1992 | Takasaki et al. ................. 395/400 |
| 5,239,647 | 8/1993 | Anglin et al. . |
| 5,293,618 | 3/1994 | Tandai et al. . |
| 5,313,646 | 5/1994 | Hendricks et al. . |
| 5,317,729 * | 5/1994 | Mukherjee et al. .................. 707/3 |
| 5,574,898 * | 11/1996 | Leblang et al. ..................... 707/1 |
| 5,649,185 | 7/1997 | Antognini et al. . |
| 5,649,200 * | 7/1997 | Leblang et al. .................... 395/703 |
| 5,678,040 * | 10/1997 | Vasudevan et al. ................... 707/8 |
| 5,838,916 * | 11/1998 | Domenikos et al. ........... 395/200.49 |
| 5,852,435 * | 12/1998 | Vigneaux et al. ................. 345/302 |
| 5,889,942 * | 3/1999 | Orenshteyn .................... 395/187.01 |
| 5,896,506 * | 4/1999 | Ali et al. ....................... 395/200.43 |
| 5,920,893 * | 7/1999 | Nakayama et al. ................. 711/147 |
| 5,933,824 * | 8/1999 | DeKoning et al. ..................... 707/8 |
| 5,970,490 * | 10/1999 | Morgenstern ....................... 707/10 |
| 6,023,706 * | 2/2000 | Schmuck et al. .................... 707/200 |

OTHER PUBLICATIONS

Gill et al "A case study of file system workload in a large–scale distributed environment", ACM 1994, pp. 276–277.*

Kamita et al. A Database Architecture and Version Control for Work Group. IEEE 1994, pp. 438–447.*

\* cited by examiner

*Primary Examiner*—Thomas Black
*Assistant Examiner*—Uyen Le
(74) *Attorney, Agent, or Firm*—Sughrue, Mion, Zinn, Macpeak & Seas, PLLC (57) ABSTRACT

A distributed client server system for managing and storing digital files includes a digital library and a shared file system, wherein the digital library further includes a library client, a library server including a library catalog, and an object server and wherein the shared file system includes a workstation with a local storage and a shared file server with a shared file storage. The digital library maintains metadata about the files in the shared file system, in a database in the library catalog. The metadata for a file includes different names for different versions of the file and a check-in status flag. A read operation is performed on the shared file system by a user retrieving a file directly from the shared file system. A write operation is performed by the user invoking a digital library application, which in turn changes the status of the flag to "checked-out". When a file is "checked-out" it can not be edited by any other user. When the "checked-out" file is saved, it is saved under a new name. When a user quits after editing the file, the status of the file is changed back to "checked-in".

18 Claims, 8 Drawing Sheets

SHARED FILE SYSTEM FOR DIGITAL CONTENT

BACKGROUND OF THE INVENTION

1. Field of the Invention

The present invention relates to the use of a file management system for storing digitized data as files in a shared file system. In particular, the invention relates to a system and method using files shared by a community of users while providing integrity, security and preventing data corruption.

2. Description of the Related Art

Computers have been used to manage business related information for a long time. However, costs associated with storage, communication and information processing prohibited the use of computers to store and manage other kinds of data. When costs came down, it became feasible to digitize and store other forms of data, including digitized data. Digitized data primarily consists of digitized visual images, audio and video, although is not limited to those types of data. Advanced information management system structures are required to store and manage digitized data.

The value of the digitized data is enhanced if it can be shared by multiple users. Use of networks and other distributed systems have made it possible to have seamless and transparent sharing of data across wide geographical areas. However, management of shared data is an issue that has confronted practitioners in this area.

Figure 1:
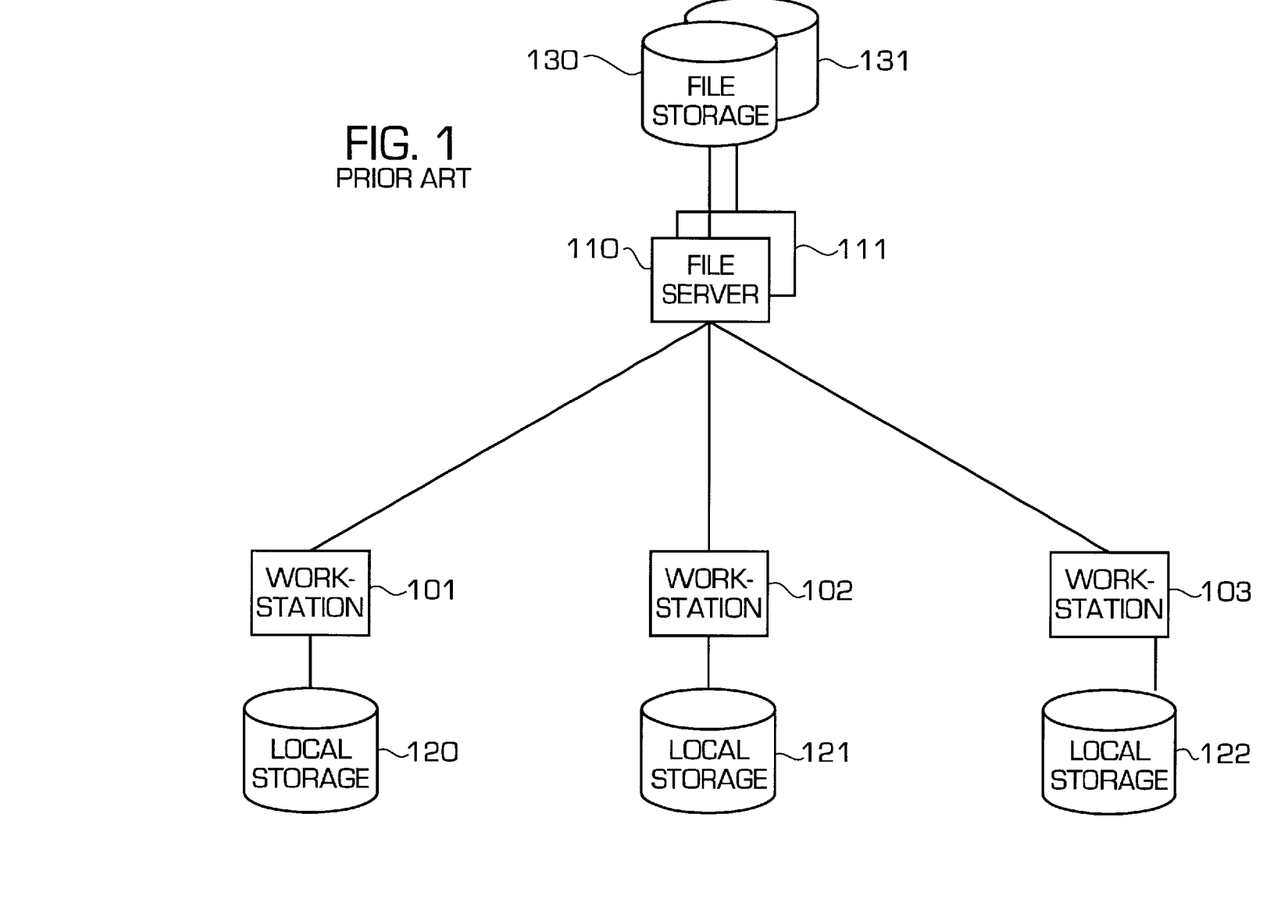
FIG. 1 is a diagram showing a conceptual model of a conventional shared file system.

One known way of sharing data among multiple users is by using a shared file system. Data to be shared by two or more users is stored in files which are then available in a transparent mode for access by all users. A conceptual view of a conventional shared file system is shown in FIG. 1. One or more workstations (101, 102, 103) are attached to one or more file servers (110, 111). Each workstation has connected to it its own local storage medium called a "local store" (120, 121, 122). Each file server has a permanent storage medium (130, 131), such as a hard disk, attached to it called a "file server store". The local store stores local files which are accessible only to the workstation connected to it. The file server store stores files that are to be shared by all the users of the system.

An example of the use of a shared file system is a community of artists creating an animation work. Individual artists use workstations for doing their work. Their private files, containing data specific to their individual work, are stored in their local store. Data which is commonly shared by all the artists is stored in the file server store. Individual artists can access common data from the shared file storage and incorporate it into their own work.

In creating animated work several artists work separately and create separate components. For example, one artist might work on animation of human characters while another might work on animation of animals while yet another artist works on the sound, background, etc. Finally, one or more artists combine the separately created components and make further additions to create the final product. A shared file system enables this production methodology by allowing the separate components to be placed on the shared file system. The artist doing the combined work accesses the shared file system and extracts the separate components into the local store of his workstation.

A shared file system provides several advantages for multiple users, such as the users being able to access and refer to each other's data. Different users can also incrementally work on a single application. However, maintaining data integrity in a shared file system has been a problem. When multiple users share a file, the data contained in the shared file is susceptible to inadvertent corruption as well as willful damage. This is particularly acute when all users have write permission. Besides, when multiple users access the file at the same time, each can change the file without knowledge of the others concurrently making changes to the same file.

The utility of a shared file system can be enhanced considerably by integrating it with a file management system. A particularly useful tool is a file management system that is part of an overall distributed computing environment. An important feature of such a file management system is in providing version control.

Version control maintains an older version of a file with either a different name or by employing an extra character in the file name. It also can provide a checking mechanism by which only one user is allowed to "check out" a file at a time. All other users are allowed to access only a read-only copy of the file. The user that has checked out the file conventionally has write permission for the file and is allowed to edit the file and save the edited file under the preexisting file name. After editing the file the user that had checked out the file has to check the file back in. The copy of the file which is checked-in then becomes the latest version of the file.

Figure 2:
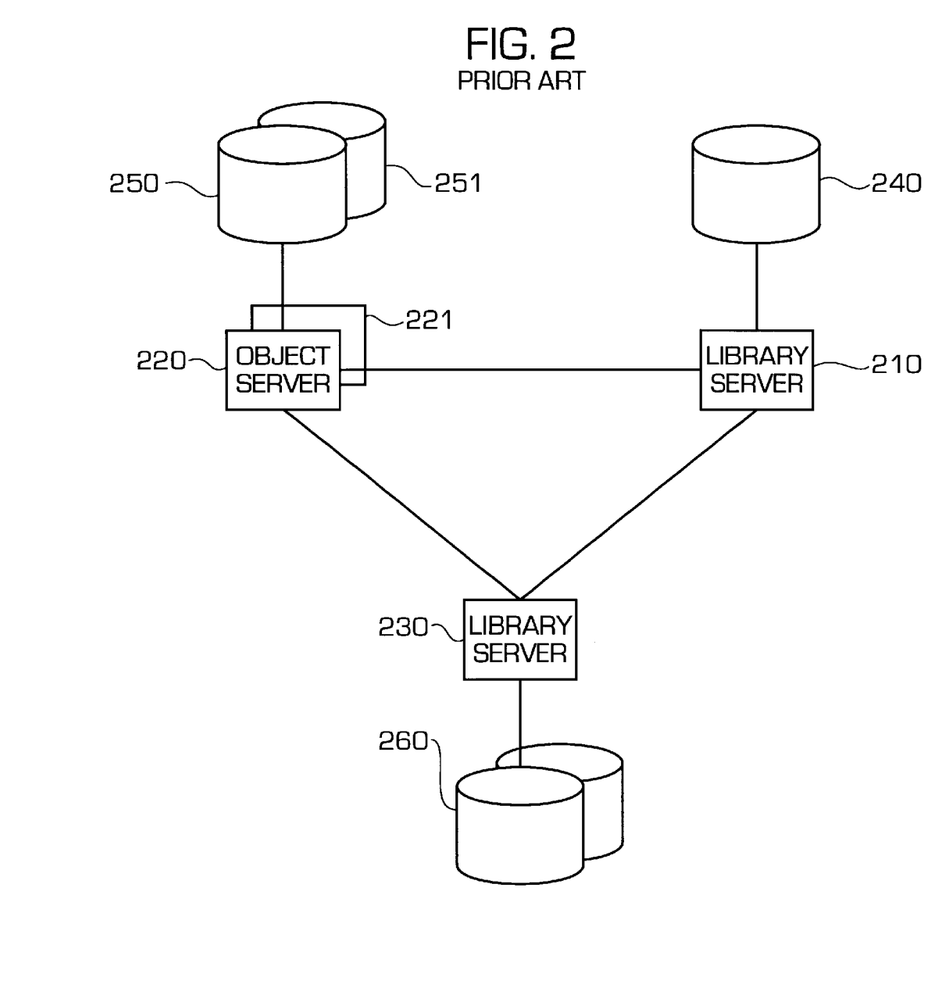
FIG. 2 is a diagram showing a conceptual view of a conventional distributed client/server system.

A distributed computing environment provides a seamless transfer of files to the user. Though the files are stored in various geographical locations, the user is able to access a file as if it is stored locally. The physical transmission of the file from a different location appears transparent to the user, An example of a distributed system is a conventional client/server system. A conceptual view of a conventional client/server system is shown in FIG. 2 and described in detail in U.S. Pat. No. 5,649,185 granted to Antognini et al. which is incorporated herein by reference. It includes a library server 210, one or more object servers (220, 221), and a library client 230. The library server, the object server and the library client, each have permanent storage media associated with it. That is the library server 210 has a library catalog 240, the object servers include object stores 250, 251, and the library client includes a client cache 260. Also a communication isolator allows the library server and library client to communicate with one another without the need for an application program in the client having to handle complex communication protocols. The library server, object servers and clients are connected by a communication network such as a wide area network or local area network. The library clients are normally implemented on a workstation and the library and object servers are implemented on a host processor which can be a workstation or a main frame computer. Library clients send requests to the library servers to store, retrieve and update objects stored in object servers. They also send requests to query the object indices and descriptive information stored in the library catalog.

Users are granted privileges for the use of the library system services. A user desiring to use the library system conventionally does so via an application program running in the client which sends a request for an item to the library server. The library server checks the library catalog to ensure that the user's name and password are valid and that the user is permitted to secure the desired service.

However, the transfer of files from a different geographical location involves overhead in terms of transmission time and resources. So if a distributed file management system is integrated with a shared file system, files will be transferred back and forth between the distributed system and the shared file system. In the case of digitized audio and video files, where the sizes of those files are extremely large, the transmission cost and times can be prohibitive. Much of the back and forth transmission of files is unnecessary because the users of a preexisting shared file system are often in close geographic proximity.

The users of a shared file system have also been accustomed to using the file system and its interface. Hence, the imposition of a new command language on the user likely would require additional training. Therefore, only essential aspects of a file management system forming part of a distributed computing environment should be incorporated into an existing shared file system.

SUMMARY OF THE INVENTION

It is an object of the present invention to solve the problems described above by using a preexisting shared file system as part of a distributed computing environment.

It is another object of the present invention to solve the problems of shared file systems. That is, the present invention provides seamless read-only capability to all users, so that all users can directly read and use the files from the shared file system without going through a centralized file management system.

It is another object of the present invention to provide write permission for a file to only one user at a time, so that the integrity of the data in the file is maintained.

It is yet another object of this invention to maintain the older versions of a file with appropriate comments and the name of the user who made the changes even after a new version of the file is created.

The present invention ensures that the users can directly read and copy files from the shared file system at the same time, ensuring that the write operation is performed through a centralized file management system. To achieve the objects discussed above the present invention is directed to a distributed shared file system for storing digital data, which includes a shared file system, a distributed client server system and a workstation. The workstation is connected to the shared file system and the distributed client server system. The shared file system is connected to the distributed client server system.

A preferred embodiment of the present invention includes a plurality of workstations and a plurality of shared file systems. Another preferred embodiment of the present invention is directed to a distributed shared file system where all the connections are remote.

Yet another preferred embodiment of the present invention is directed to a distributed shared file system as described above where the client server system comprises a plurality of library clients each having a client storage area, a plurality of object servers each having an object storage area, a library server including a relational database and an index. The plurality of object servers remotely connected to the plurality of library clients and the library server is remotely connected to the plurality of object servers and the plurality of library clients.

The present invention also is directed to a method for reading files from a shared file system, forming part of a distributed computing environment including a user making a read file request at a workstation; the workstation determining if the user has permission to read the file; the workstation displaying an error message to the user if the user does not have the appropriate permission; and the workstation copying the file from the file storage medium of the file server to the local storage medium of the workstation.

The present invention also provides for a method of managing files in a distributed shared file system using a check-in flag and a naming convention for files, including copying the files directly from the shared file system to local storage for a read operation bypassing the file management system; the file management system indicating the file as checked-out when edit operations are occurring; the file management system indicating the file as checked-in after completion of the edit operation; and the file management system saving the edited file with a new name and retaining the older file.

Another aspect of the present invention relates to a method of editing files forming part of a distributed computing environment, including a local storage medium, the method including a user making an edit file request at a workstation; the workstation sending the request to the shared file management system of a distributed client-server system; the file management system determining if the user has edit permission; the file management system sending an error message to the workstation if the user has no edit permission; the file management system determining if the file is checked-out; the file management system sending a checked-out message if the file is checked-out; the file management system indicating the file as checked-out if the user has edit permission and the file is not checked-out; the file management system directing the file server to copy the file from the file storage medium to the local storage medium; the file management system sending a message to the workstation when the file is complete; the user sending a save message to the file management system to save the edited file; the file management system determining if changes have been made to the file in response to receiving the save message; the file management system directing the file server to copy the edited file from the local storage media to the file storage media; and the file management system naming the edited file with a new name and retaining the existing file.

The present invention also provides for a method of quitting the file after a save operation including the user sending a quit message to the file management system; the management system saving the file, if the user has sent a save message with the quit message; the file management system recording the name of the user and comments; and the file management system indicating the file as checked-in.

The present invention provides a computer program product for connecting a shared file system, to a digital library; wherein the shared file system includes a file server and a storage medium; wherein the digital library system includes a client, an object server and a library server; the computer program product including a computer readable medium comprising: a computer-readable distributed client server system code; a computer-readable shared file system code; and a computer-readable workstation program code; wherein the distributed client server system logically maintains a version control system including the check-in status of a file and a plurality of versions of the file with different versions having different names; wherein the shared file system physically maintains the plurality of versions of each file; wherein, a read operation is performed directly by copying files from the shared file system code to the local storage of the workstation; wherein, an edit operation is performed by requesting the distributed client server system, and the distributed client server system code checking the check-in status of the requested file, sending a message back to the user when the file is already checked-out, directing the file server to copy the latest version of the requested file to the workstation local medium and changing the status to checked-out; and wherein a save and quit operation is performed by requesting the distributed client server system code, and the distributed client server system code directing the workstation to copy the file from the local storage medium to the shared file storage under a new name, recording comments and the user name along with the new name for the file and changing the check-in status of the file to checked-in.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of a shared file system for digital content, according to the present invention is described below in detail with reference to the accompanying drawings.

Figure 3:
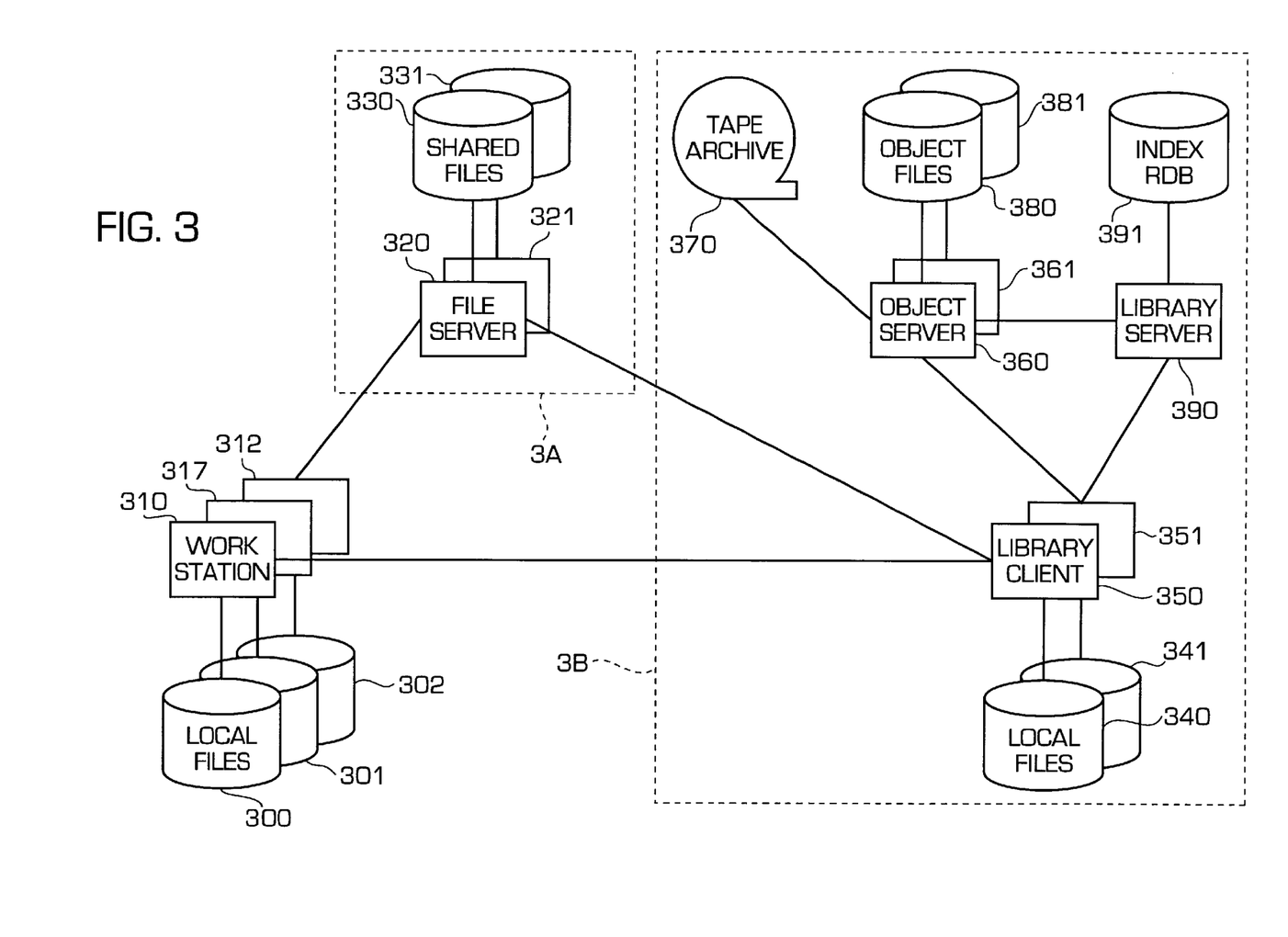
FIG. 3 is a diagram of a shared file system connected to a distributed client/server system according to the present invention.

FIG. 3. is a conceptual representation of an embodiment of the current invention. Box 3A represents a shared file system. Workstations 310, 311 and 312 are part of a shared file system. Local stores 300, 301 and 302 are connected to the workstations 310, 312 and 312, respectively. File servers 320 and 321 are part of the shared file system and shared file stores 330 and 331 are connected to file servers 320 and 321, respectively.

A digital library system 3B is a distributed computing environment with a file management system. An embodiment of a digital library is described by Antognini et al. A digital library is an example of a conventional client/server system. Library clients 350 and 351 are part of the digital library client/server system. The library clients 350 and 351 have local stores 340 and 341, respectively. The digital library comprises two type of servers; object servers 360 and 361 and a library server 390. Local stores 380 and 381 are connected to the object servers. An index store 391 is connected to the library server 390. A tape archive 370 is connected to the object servers 360 and 361.

The users of the shared file system interact with the system using workstations 310, 311 and 312. Their local files are stored in the local stores 300, 301 and 302, respectively. The shared files in the shared file system are made available to the users by the file servers 320 and 321. The shared files are physically stored in the shared file stores 330 and 331. The shared file system is connected to the library clients in the digital library client-server system. That is, when the users interacting with workstations 310, 311 and 312 require the use of the digital library, they can invoke a digital library application program which accesses the digital library system via the library clients 350 and 351. The local files belonging to the users of the digital library are stored in the local stores 340 and 341. The persistent objects that the users of the digital library require are provided to them by the object servers 360 and 361. The persistent objects that need to be stored on permanent media are stored in the digital library system in the object file stores 380 and 381. The object servers, under control of the library server 390, extract objects from these object storage stores when they are required by the users of the digital library. The local store 391 connected to the library server contains a library catalog which preferably is a database describing the contents of the files and the objects stored in the digital library.

In the present invention metadata about the files stored in the shared file system is stored in the database within the index store 391. Therefore, the metadata of the files in the shared file system can be provided to the users of the shared file system by invoking a library client application on the workstations 310, 311 and 312. Also, the library server acts as a control point for accessing and changing the metadata of the files in the shared file system.

Figure 4:
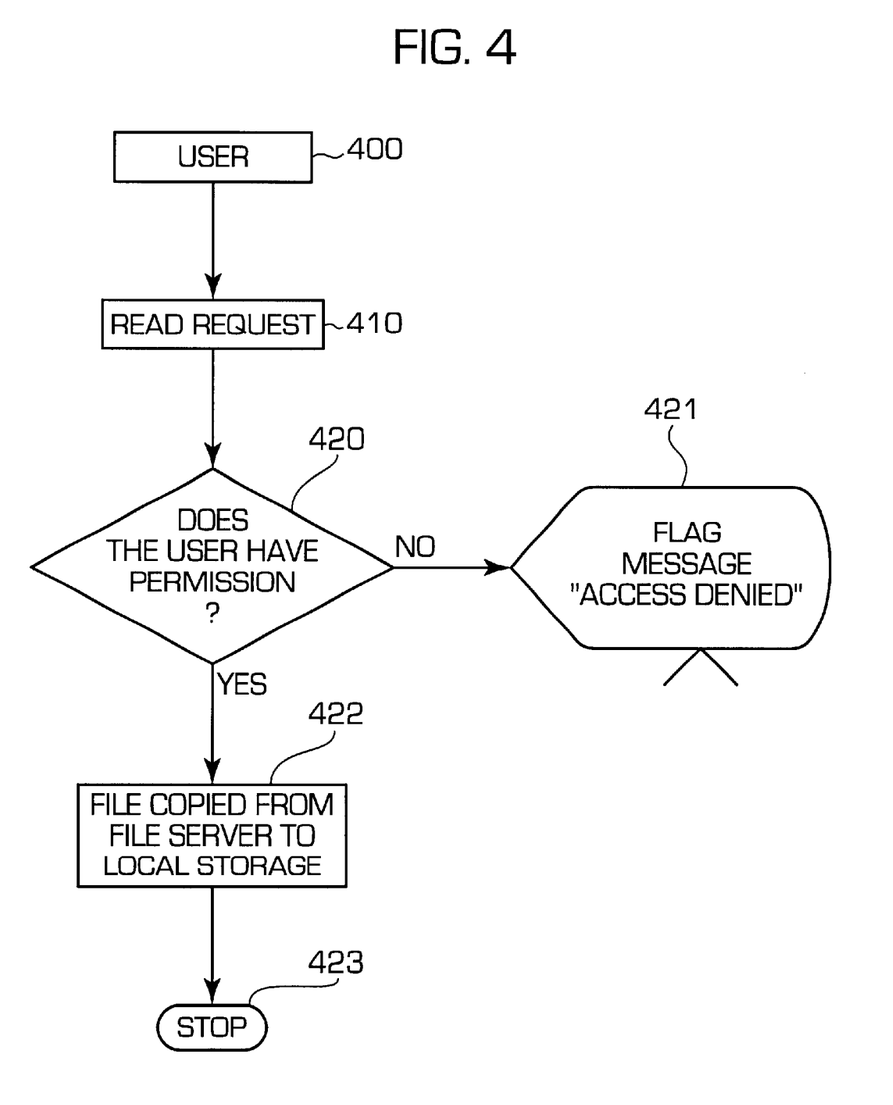
FIG. 4 is a flowchart depicting a read operation in a shared file system connected to a distributed client/server system incorporating a file management system.

FIG. 4. depicts a flowchart detailing a read operation according to the present invention. A user begins interacting with the shared file system in 400. The user makes a read request at his workstation in 410. In 420 the shared file system determines whether the user has read permission for the requested file. If the user does not have the required read permission, a message is passed to the user in 421, indicating that the user is denied access to the requested file. If the user has permission, the requested file is transferred from file server store to the local store in 422.

Figure 5A:
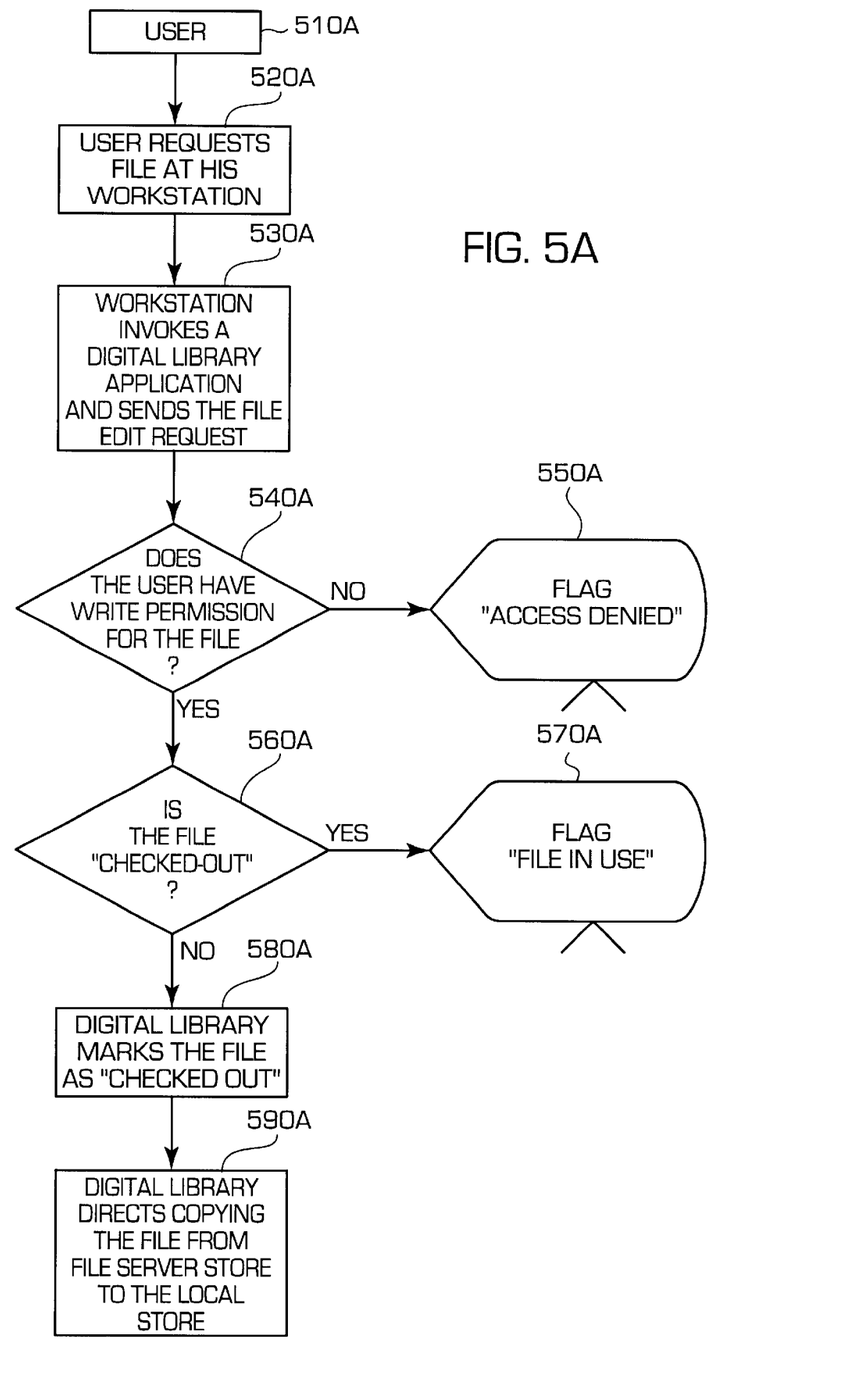
FIGS. 5A and B are flowcharts depicting a write operation in a shared file system connected to a distributed client/server system incorporating a file management system.
Figure 5B:
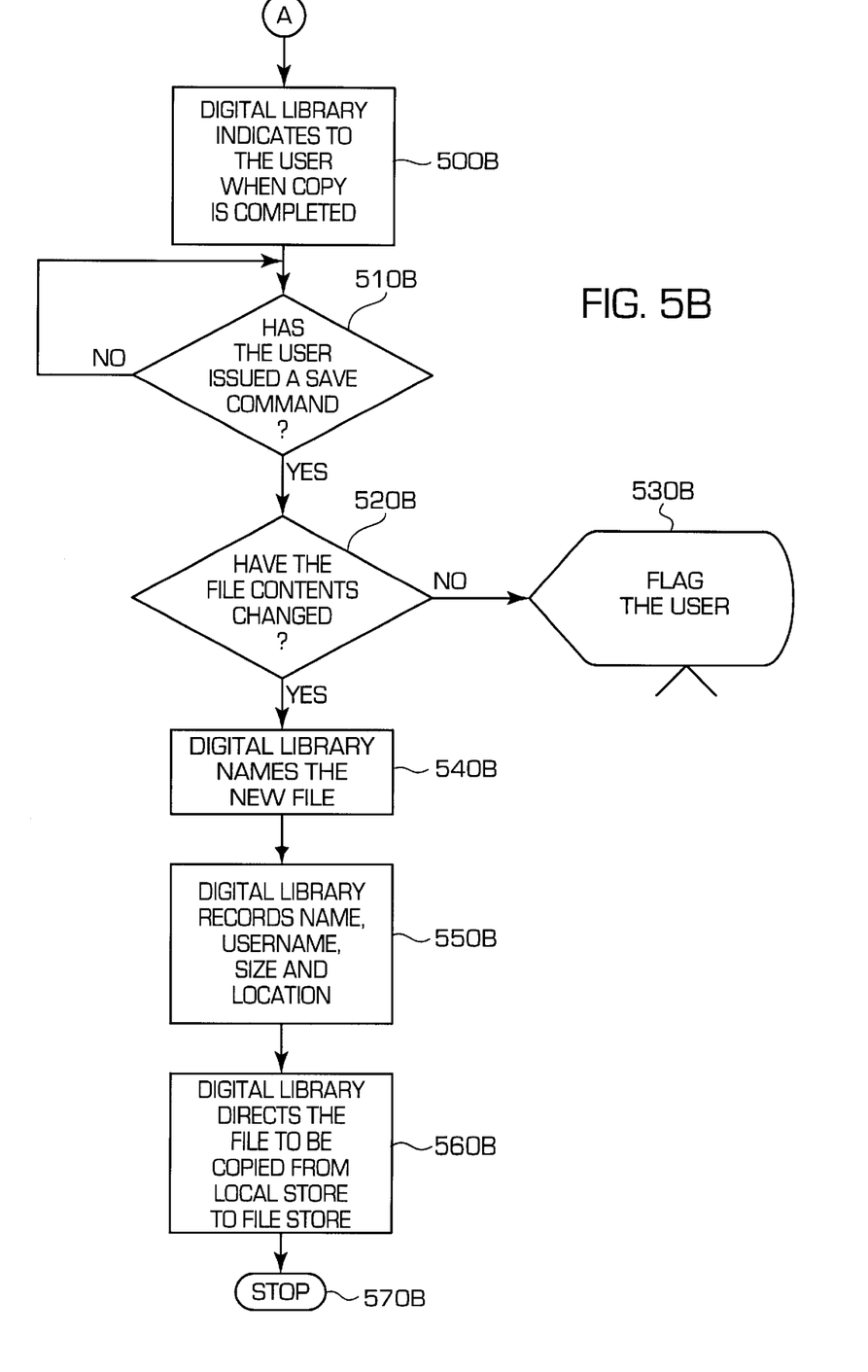

FIGS. 5A and 5B together depict a flowchart detailing a write operation according to the present invention. A user begins interaction with the shared file system in 510A. In 520A the user requests a file for a write operation at his workstation, thereby invoking a digital library client application. In 530A the library client sends the request to the digital library server. The file management system in the library server checks the metadata of the requested file, which is stored in the library server local store, to determine if the user has write permission for the requested file, in 540A. If the user does not have writer permission for the requested file the library server indicates so and a message is sent to the workstation indicating that the user is denied write permission, in 550A. If the user has write permission, the file management system, in 560A, determines whether the file is already checked out. If the file is checked out, the library server sends a message back to the workstation indicating that the file is in use, in 570A. If the file is checked-in, then the library server, in 580A, changes the metadata of the file in the database to indicate that the file is checked out. In 590A the library server sends a message based on which the digital library directs the copying of the file from the file server storage to the local store of the user's workstation.

As shown in FIG. 5B, in 500B the digital library indicates to the user when the copying is completed. In 510B the digital library enters an idle mode where it waits for the user to issue a save command. After the user issues a save command, in 520B, the digital library determines whether the file contents have changed. In the case where the contents have not changed, in 530B, the digital library indicates to the user that the contents have not changed. If the file contents have changed, in 540B, the digital library names the file according to a predetermined naming convention, which is different from the name of the original file retrieved from the digital library. In 550B the library server preferably records the new filename, user name, size and location of the file in the database as part of the metadata for the file. In 560B the digital library directs the copying of the file from the user's workstation local store to the shared file store.

Figure 6:
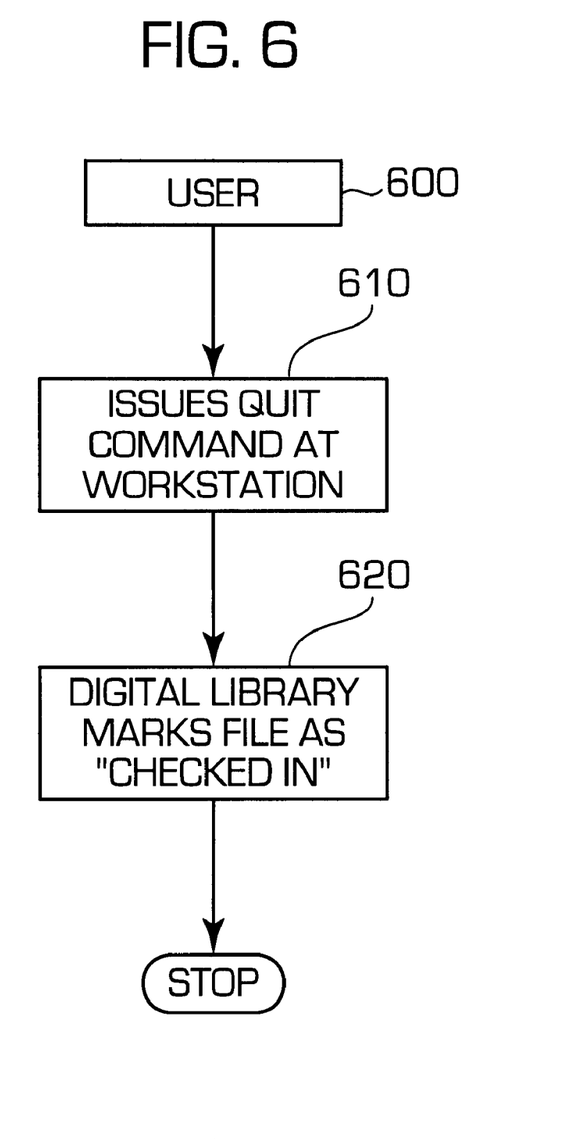
FIG. 6 is a flowchart depicting a quit operation in a shared file system connected to a distributed client/server system incorporating a file management system.

FIG. 6 depicts a flowchart detailing a "quit" operation according to the present invention. A user begins interacting with shared file system in 600. In 610 the user issues a quit command. In 620 the workstation initiates a digital library application program which changes the metadata of the previously checked-out file to indicate that the file has been checked-in.

An example illustrating the use of the present invention is a group of artists creating animated features using a shared file system to maintain the digital artwork. Prior to using the present invention the artists would have had to use a universal read/write access system to read the files in a shared file system. Because of the problems caused by universal read/write access, considerable time and artwork would be lost. The present invention enables the artists' assets to be brought under the control of a digital library, preferably as described by Antognini et al.

Here, the artists are allowed the use of the existing file system on a "read only" basis. That is, for read operations, the artists will not experience any changes from the preexisting shared file system that is conventionally used.

For write operations, the system according to the present invention allows artists to proceed only through the file management system within the digital library system. Users wishing to modify and write to an existing file will invoke a digital library application program, preferably through a web browser. The digital library, in response to the digital library application program, changes the "checked-in" status of the file to "checked-out". The digital library then directs the shared file system to make a copy of the requested file to the local store of the artists' workstation. The digital library stores the name of the file, the check-in-status of the file, the name of the user and the time. When another artist requests the same file for editing purposes, the digital library application invoked sends a message that the file is in use and provides information identifying the artist who has "checked out" the requested file. The digital library also informs the user that, if needed, a read-only copy can be provided.

After an artist has completed modifying the file, a second digital library application is launched. This second digital library application directs the file to be copied back to the shared file system. After the artist has completed the current session and invokes a quit command, the first digital library application changes the check-in-status to "checked-in", thereby making the file available to others for editing purposes.

Figure 7:
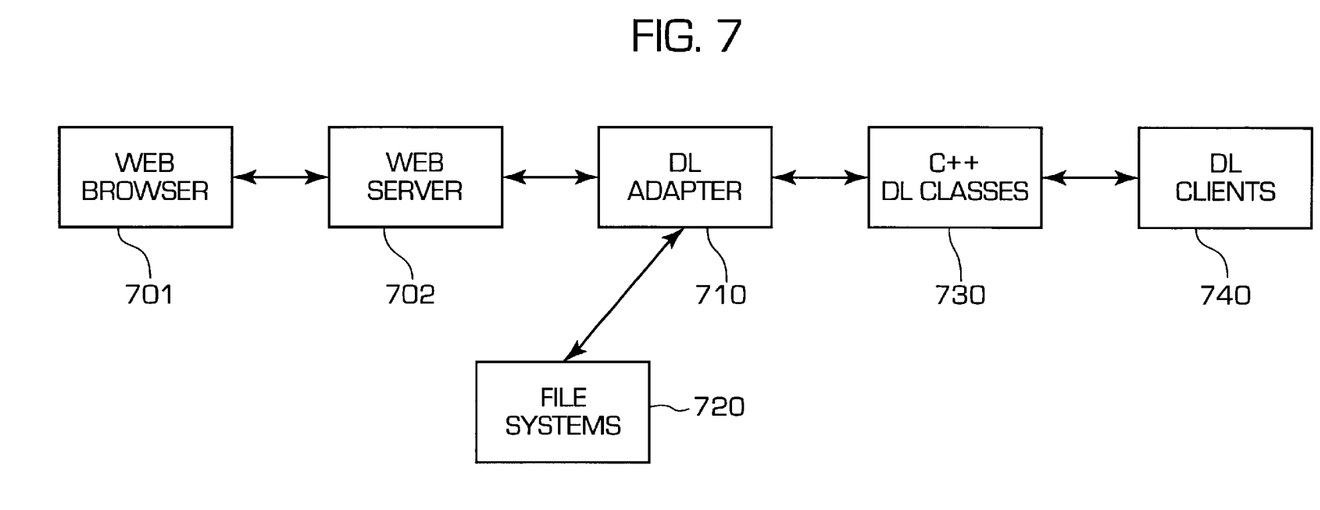
FIG. 7 depicts an example of a shared file system according to a preferred embodiment of the present invention.

FIG. 7 shows a block diagram for an alternative embodiment of the invention. In this embodiment a web browser 701 is used. An example of a commonly used web browsers is Netscape Navigator. The web browser communicates with a web server 702, which is a standard HTTPD web server. The web server communicates with a digital library adapter 710. The digital library adapter 710 is connected to a shared file system 720 with which it communicates. The digital library has available to it a set of C++ objects which are part of the digital library class library 730, as described in U.S. patent application Ser. No. 08/688,120 now U.S. Pat. No. 5,787,413, which is incorporated by reference herein. These objects communicate with the digital library client 740, which in turn provides an interface to the digital library.

The use of a digital library as a storage management system for performing version control provides the users with several advantages. The users are given the ability to collect and search on metadata concerning the files stored in the shared file system. The digital library system is also accessible via web browsers, thereby making the digital library application program platform independent. The shared file system of the present system handles all read-only requests without invoking the digital library, thereby reducing the transmission time and transmission costs. It also reduces the impact of going through the web server and other communication channels that distributed systems usually impose.

The file management system according to the alternative embodiment of the present invention can also be used as a source code control system, to control versions of computer programs during program development. This alternative embodiment also only minimally disrupts users that already use a shared file system. The digital library system is visible to the users of this alternate embodiment only as a small set of web applications which are used when editing is required. This invention is also robust enough to be extended to users of any shared file system.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A distributed shared file system for storing digital data comprising:

a shared file system having a shared file system interface, said shared file system for storing shared user files;

a distributed client-server system having a distributed client-server system interface different from said shared file system interface, said distributed-client server system storing metadata related to said shared user files; and a workstation, wherein the workstation is separately connected to the shared file system and the distributed client server system and the shared file system is connected to said distributed client-server system, wherein users can access said shared file system using said shared file system interface, wherein said users perform at least one of reading and copying operations of said shared user files directly from said shared file system without direct involvement of said distributed client-server system, wherein upon an edit request by a user, the distributed client-server system directs the shared file system to send a copy of a shared file from the shared file system to the workstation, wherein editing of said shared user files requires updating said metadata in said distributed client-server system.

2. A distributed shared file system according to claim 1, wherein a plurality of workstations are connected to the shared file system.

3. A distributed shared file system according to claim 1, wherein a plurality of shared file systems are connected to the distributed client-server system.

4. A distributed shared file system according to claim 2, wherein a plurality of shared file systems are connected to the distributed client-server system and to one or more of the plurality of workstations.

5. A distributed shared file system according to claim 3, wherein one or more of the file servers, the workstations and the client-server system are located remote to one another.

6. A distributed shared file system according to claim 4, wherein the client-server system comprises a library client having a client storage area, an object server having an object storage area, and a library server including a library catalog, wherein the object server is connected to the library client and library server, the library server is connected to the object server and library client, and the library server is located remotely with respect to the library client.

7. A distributed shared file system according to claim 1, wherein the workstation is connected to the distributed client-server system through a network browser.

8. A distributed shared file system according to claim 2, wherein the workstation is connected to the distributed client-server system through a network browser.

9. A distributed shared file system according to claim 3, wherein the workstation is connected to the distributed client-server system through a network browser.

10. A distributed shared file system according to claim 4, wherein the workstation is connected to the distributed client-server system through a network browser.

11. A distributed shared file system according to claim 5, wherein the workstation is connected to the distributed client-server system through a network browser.

12. A distributed shared file system according to claim 6, wherein the workstation is connected to the distributed client-server system through a network browser.

13. A method for reading from a distributed shared file system including a file server having a file storage medium having a file recorded thereon, a distributed client-server system having at least a client, an object server, and a library server, and a workstation having a local storage medium, wherein the workstation is separately connected to the shared file system and to the distributed client server system, and wherein the shared file system is connected to said distributed client-server system, the method comprising:
   (a) receiving a request for access to read the file;
   (b) determining if the user has permission to read the file, said determining being done based on metadata about the file stored in the distributed client-server system; and
   (c) copying the file directly from the file storage medium of the file server to the local storage medium of the workstation if the user is determined to have permission to read the file, said copying being performed without direct involvement of the distributed client-server system.

14. A method of editing and saving files from a distributed shared file system including a file server having a file storage medium, a distributed client-server system having at least a client, at least an object server, a library server and a shared file management system employing a check-in flag and storing files based on a naming convention, and a workstation having a local storage medium, wherein the workstation is separately connected to the shared file system and to the distributed client server system, and wherein the shared file system is connected to said distributed client-server system, the method comprising:
   (a) sending an edit file request from the workstation to the shared file management system of the distributed client-server system;
   (b) in response to the edit file request the shared file management system checking to determine if a user has edit permission for the file with corresponding metadata stored in the distributed client-server system;
   (c) in response to the edit file request, if the user is determined to have edit permission, the shared file management system checking to determine if the file is checked-out;
   (d) the shared file management system, via said corresponding metadata stored in the distributed client-server system, indicating the file as checked-out if the user has edit permission and the file is not checked-out and directing the file server to copy the file from the file storage medium to the local storage medium;
   (e) sending a save message to the shared file management system to save the file to the file server if the file has been edited;
   (f) in response to the save message the shared file management system checking to determine if the file has been edited; and
   (g) if the file is determined to have been edited the shared file management system directing the file server to copy the edited file from the local storage medium to the file storage medium and naming the edited file with a name different from the file copied from the shared file management system.

15. A method according to claim 14, further comprising:
   (h) performing a quit operation after copying the edited file to the file storage medium, comprising:
   (h1) sending a quit message to the file management system;
   (h2) the file management system saving the file, if a save message is received with the quit message;
   (h3) the file management system recording the name of the user and comments; and
   (h4) the file management system indicating the file as checked-in.

16. A computer program product for connecting a shared file system to a digital library in a system that includes a workstation that is separately connected to the shared file system and to the digital library, wherein the shared file system includes a file server and a storage medium, and the digital library system includes a client, an object server and a library server, the computer program product including a computer readable medium comprising:
   a computer-readable distributed client-server system code;
   a computer-readable shared file system code; and
   a computer-readable workstation program code;
   wherein the distributed client-server system code logically maintains a version control system including a check-in status of a file and a plurality of versions of the file with different versions having different names;
   wherein the shared file system code physically maintains the plurality of versions of each file;
   wherein, in response to performance of a read operation on the file, the shared file system code causes the file to be copied directly to a local storage unit of the workstation;

wherein, in response to performance of an edit operation on the file, the distributed client-server system code is requested to provide the file, and the distributed client server system code checks a check-in status of the requested file, and either sends a message to the requester when the file is already checked-out, or directs the file server to copy the latest version of the requested file to the local storage unit of the workstation and changes the status of the file to checked-out; and wherein a save and quit operation is personnel by requesting the distributed client-server system code to direct the workstation program code to copy the file from the local storage unit to storage controlled by the shared file system code under a new name, recording comments and the user name along with the new name for the file and changing the status of the file to checked-in.

17. A system according to claim 1 wherein said users perform editing operations through the distributed client-server system.

18. A method of managing files in a distributed shared file system including a workstation, a shared file system and a digital library, wherein the workstation is separately connected to the shared file system and to the distributed client server system, and wherein the shared file system is connected to said distributed client-server system, wherein said shared file system stores user files, and wherein said digital library stores metadata relating to said user files, said method comprising:

(a) copying one of said user files, having a first name, to a local storage unit in response to a request;

(b) indicating the file as checked-out when an editing operation is performed by setting metadata associated with the file to reflect a checked-out state;

(c) indicating the file as checked-in after completion of the edit operation, by setting the associated metadata to reflect a checked-in state; and (d) saving the edited file in the shared file system under a second name, different from the first name.

* * * * *